3,303,222
PROCESS FOR THE THERMAL HYDRODEALKYL-
ATION OF AN ALKYL HYDROXY AROMATIC
COMPOUND IN THE PRESENCE OF AN ALKYL
AROMATIC COMPOUND
William C. Offutt, Pittsburgh, Pa., assignor to Gulf Research & Development Company, Pittsburgh, Pa., a corporation of Delaware
No Drawing. Filed Nov. 4, 1963, Ser. No. 321,321
9 Claims. (Cl. 260—621)

This invention relates to a process for the thermal hydrodealkylation of an alkyl hydroxy aromatic compound, such as cresols, to obtain a hydroxy aromatic, such as phenol.

Alkyl aromatics, such as toluene, can be dealkylated to lighter aromatics, such as benzene, by subjecting such alkyl aromatic in the presence of hydrogen but in the absence of catalyst to an elevated temperature and elevated pressure for a controlled length of time. As a result of such reaction conditions the alkyl group is cleaved from the alkyl aromatic and combines with the hydrogen present to form a saturated aliphatic hydrocarbon. The desired aromatic can be separated from the saturated aliphatic hydrocarbon and unreacted alkyl aromatic, if present, in any convenient manner.

When an alkyl hydroxy aromatic, such as a cresol, is similarly subjected to thermal hydrodealkylation, however, not only is the alkyl substituent removed and the same results noted above obtained, but there is also a tendency for the hydroxyl group to be cleaved from the aromatic ring and be replaced with hydrogen. The hydroxyl group so removed combines with another hydrogen to form water. Accordingly, an alkyl hydroxy aromatic, under such circumstances, will have a tendency to be converted to the corresponding aromatic, instead of the corresponding hydroxy aromatic, and a large amount of saturated aliphatic hydrocarbon and water will be formed. Selectivity of the alkyl hydroxy aromatic charge under thermal hydrodealkylation conditions to the corresponding hydroxy aromatic can be improved by converting only a portion of such charge. For example, in application Serial No. 245,848, filed by Jonas Dedinas, Alfred M. Henke and William C. Offutt on December 19, 1962 and assigned to the same assignee of the present application, it was found that a monoalkylated phenol, such as cresol, could be dealkylated and selectivity to phenol improved by converting no more than about 88 to about 92 mol percent, preferably no more than about 90 mol percent, of the monoalkylated phenol subjected to thermal hydrodealkylation. On a minimum basis it was preferred to dealkylate at least about 25 to about 35 mol percent of the monoalkylated charge.

I have found that when an alkyl hydroxy aromatic is subjected to thermal hydrodealkylation conditions the selectivity to the corresponding hydroxy aromatic is increased if the thermal hydrodealkylation of said alkyl hydroxy aromatic is conducted in the presence of a selected amount of the corresponding alkyl aromatic, that is, a compound similar to the charge but without a hydroxyl group on the ring. Additionally, selectivity of the alkyl hydroxy aromatic to the corresponding aromatic is also increased as a result thereof.

In order to carry out the reaction the alkyl hydroxy aromatic, a selected amount of a corresponding alkyl aromatic, and hydrogen, together or separately, are first preheated to reaction temperature in any suitable manner, for example, by passing the same through a tubular member in indirect contact with heat-producing elements, such as burners. Among the alkyl hydroxy aromatics which can be subjected to the thermal hydrodealkylation conditions of this invention are mononuclear alkyl hydroxy aromatics, such as cresol (ortho, meta or para or any combination thereof), ethyl phenol, isopropyl phenol, xylenols, trimethyl phenols, methyl ethyl phenol, etc.; polynuclear alkyl hydroxy aromatics, such as 2,2′-dimethyl-6-hydroxydiphenyl, 4,4′-dimethyl-2-hydroxydiphenylmethane, 2-methyl-3-hydroxydiphenyl, etc.; and condensed polynuclear alkyl hydroxy aromatics, such as methyl naphthol, ethyl naphthol, dimethyl naphthol, etc. Preferably the charge is an alkyl phenol, particularly a cresol such as para cresol.

The amount of hydrogen which must be present in the charge must be that sufficient to replace the alkyl chain and hydroxyl group cleaved from the aromatic ring at the elevated reaction temperature and also to combine with the alkyl chain and hydroxyl group so removed to form a saturated aliphatic hydrocarbon and water, respectively. In general, while the molar ratio of hydrogen to alkyl hydroxy aromatic can vary over a wide range, a molar ratio of about one to about ten, preferably about four to about eight, is employed.

The temperature required to effect the desired hydrodealkylation can be from about 900° to about 1600° F., preferably about 1000° to about 1350° F. While pressure is not critical and can be in excess of about 100 pounds per square inch gauge, I prefer to employ a pressure in the range of about 200 to about 1000 pounds per square inch gauge. A space velocity of at least about 0.2, preferably about 0.5 to about 3.5 (total volume of alkyl hydroxy aromatic per free reactor volume per hour) can be employed.

Any type of reactor, but preferably a tubular reactor, heated, for example, in the same manner as the preheater described above, can be employed. The walls of the reactor should be free of material that will catalyze the thermal hydrodealkylation procedure defined herein, and the internals of the reactor should similarly be free of catalytic material. If desired, the reactor can be filled with non-catalytic material, such as quartz chips, in order to effect better mixing and to reduce temperature gradients therein.

The reaction is continued and then terminated when at least about 25 to about 35 mol percent of the alkyl hydroxy aromatic but no more than about 88 to about 92 mol percent of the alkyl hydroxy aromatic has been converted. To terminate the reaction, the reaction mixture is quenched to a temperature where the reaction essentially ceases, which can be from about 80° to about 800° F., in any suitable manner, for example, by indirect contact with a cooling medium.

The product obtained consists essentially of unreacted alkyl hydroxy aromatic, the corresponding alkyl aromatic, the corresponding aromatic, the corresponding hydroxy aromatic, hydrogen, a saturated aliphatic hydrocarbon, such as methane, and water. To recover said corresponding hydroxy aromatic, which forms the substantial portion of the reaction mixture, the mixture can be treated in any suitable manner to remove water therefrom, for example, by passing the same through 4A Linde molecular sieves or other adsorbent material having a greater specificity for water than the hydrocarbons or the hydroxy aromatic. The remaining product for purposes of recovery can be separated into its individual components, or selected combinations thereof, by any suitable means, by fractional distillation at sub-atmospheric, atmospheric or superatmospheric pressure, for example, a temperature of about 170° to about 450° F. and atmospheric pressure.

Desirably the alkyl aromatic that must be present in the thermal hydrodealkylation reaction zone with the alkyl hydroxy aromatic charge in accordance with the procedure defined herein is obtained from the reaction mixture resulting from the defined thermal hydrodealkylation reaction. In such case the alkyl aromatic is recovered from the thermal hydrodealkylation reaction mixture, in the manner described above, and recycled to the thermal hydrodealkylation reaction zone. If during such recycle some of the dealkylated, dehydroxylated aromatic is also returned to the thermal hydrodealkylation reaction zone, the benefits of this invention will still be obtained, for the dealkylated, dehydroxylated aromatic will be unaffected by the reaction conditions in the thermal hydrodealkylation zone. The desired alkyl aromatic for use in the thermal hydrodealkylation reaction defined herein need not be obtained from the thermal hydrodealkylation reaction mixture, as described, but can be obtained from any source. As long as the thermal hydrodealkylation reaction defined herein is carried out in its presence the benefits described herein will be obtained. The amount of said alkyl aromatic that must be present during the thermal hydrodealkylation reaction defined herein can be varied over a wide range, but in general at least about five, preferably about eight to about 25, percent by weight of said alkyl aromatic relative to the charge is sufficient.

The process of this invention can further be illustrated by the following. A series of runs was made in which para cresol was subjected to thermal hydrodealkylation conditions. Additionally, two runs were made charging mixtures consisting of 88 percent by weight of para cresol and 12 percent by weight of toluene to thermal hydrodealkylation reaction conditions. In each case a reactor having a volume of 50 milliliters filled with a non-catalytic material, quartz chips, to effect better mixing and to reduce temperature gradients was employed. Each of the charge stocks was mixed with hydrogen before pre-heating. The average reactor temperature was determined from several temperature measurements made inside the reactor with a movable chromel-alumel thermocouple. Pressures and temperatures were maintained at set values by means of automatic control instruments. The unit was run two hours off-stream to allow for stabilization of process conditions. Subsequently a three-hour on-stream period was made during which product was collected and process conditions were maintained constant. The results obtained are tabulated below in Table I. Run No. 1 in the table represents the result obtained at 50 percent conversion in the series of runs wherein only para cresol was subjected to thermal hydrodealkylation reaction conditions.

TABLE I

| | Run No. | | | Average Of Runs Nos. 2 And 3 |
|---|---|---|---|---|
| | 1 | 2 | 3 | |
| Charge, percent by weight: | | | | |
| Para Cresol | 100 | 88 | 88 | |
| Toluene | 0 | 12 | 12 | |
| Duration Of On-Stream Period, hours | 3 | 3 | 3 | |
| Conditions: | | | | |
| Temperature, °F | 1,150-1,350 | 1,265 | 1,150 | |
| Pressure, p.s.i.g | 750 | 750 | 750 | |
| Space Velocity, vol./vol./hour | 0.8-2.6 | 2.0 | 1.5 | |
| Hydrogen/Cresol, mol/mol | 3.0-5.0 | 4.8 | 4.8 | |
| Conversion, percent | 50 | 52.6 | 49.4 | 51 |
| Selectivity, mol percent: | | | | |
| Phenol | 52.5 | 65.4 | 70.8 | 68.1 |
| Toluene | 31.0 | 7.4 | 15.0 | 11.2 |
| Benzene | 10.0 | 20.0 | 20.4 | 20.3 |

The data in Table I clearly illustrates the advantage of subjecting an alkyl hydroxy aromatic to thermal hydrodealkylation reaction conditions in the presence of a selected amount of a corresponding alkyl aromatic, that is, one identical to the charge but without the hydroxyl group. Thus, if we consider the averages of Runs Nos. 2 and 3 and compare the same with Run No. 1, it is apparent that the selectivity of para cresol to phenol was greatly increased when the reaction was carried out in the presence of a small amount of toluene. The selectivity of para cresol to benzene was also greatly increased. While it would have been more desirable to have converted all of the para cresol to phenol, if conversion thereof to a product other than phenol has to occur it is better that conversion thereof is to benzene rather than toluene. Note, too, that the selectivity of para cresol to toluene was desirably greatly decreased. It may be pointed out that while the selectivity values in Table I do not add up to 100 percent, it is believed the relative results obtained are accurate.

Obviously many modifications and variations of the invention, as hereinabove set forth, can be made without departing from the spirit and scope thereof, and therefore only such limitations should be made as are indicated in the appended claims.

I claim:

1. A process for converting a monoalkyl phenol wherein the alkyl substituent thereon has from one to three carbon atoms to a product that includes phenol which comprises reacting said alkyl phenol in the presence of an alkyl aromatic corresponding to said alkyl phenol with at least about one mol per mol thereof of hydrogen at a temperature of about 900° to about 1600° F.

2. A process for converting a monoalkyl phenol wherein the alkyl substituent thereon has from one to three carbon atoms to a product that includes phenol which comprises reacting said alkyl phenol in the presence of at least about five percent by weight of an alkyl aromatic corresponding to said alkyl phenol with at least about one mol per mol thereof of hydrogen at a temperature of about 900° to about 1600° F.

3. A process for converting cresol to a product that includes phenol which comprises reacting said cresol in the presence of toluene with at least about one mol per mol thereof of hydrogen at a temperature of about 900° to about 1600° F.

4. A process for converting cresol to a product that includes phenol which comprises reacting said cresol in the presence of at least about five percent by weight of toluene with at least about one mol per mol thereof of hydrogen at a temperature of about 900° to about 1600° F.

5. A process for converting para cresol to a product that includes phenol which comprises reacting said para cresol in the presence of toluene with at least about one mol per mol thereof of hydrogen at a temperature of about 900° to about 1600° F.

6. A process for converting para cresol to a product that includes phenol which comprises reacting said para cresol in the presence of at least about five percent by weight of toluene with at least about one mol per mol thereof of hydrogen at a temperature of about 900° to about 1600° F.

7. A process for converting a monoalkyl phenol wherein the alkyl substituent thereon has from one to three carbon atoms to a product that includes phenol which comprises reacting said alkyl phenol in the presence of an alkyl aromatic corresponding to said alkyl phenol with at least about one mol per mol thereof of hydrogen at a temperature of about 900° to about 1600° F., said alkyl aromatic having been obtained from the reaction product and recycled to the reaction zone.

8. A process for converting cresol to a product that includes phenol which comprises reacting said cresol in the presence of toluene with at least about on mol per mol thereof of hydrogen at a temperature of about 900° to about 1600° F., said toluene having been obtained from the reaction product and recycled to the reaction zone.

9. A process for converting para cresol to a product that includes phenol which comprises reacting said para cresol in the presence of toluene with at least about one mol per mol thereof of hydrogen at a temperature of about 900° to about 1600° F., said toluene having been obtained from the reaction product and recycled to the reaction zone.

References Cited by the Examiner
UNITED STATES PATENTS
2,003,941   6/1935   Kahl _____ 260—621

LEON ZITVER, *Primary Examiner.*
D. M. HELFER, *Assistant Examiner.*